(12) United States Patent
Jo et al.

(10) Patent No.: US 10,721,281 B2
(45) Date of Patent: Jul. 21, 2020

(54) METHOD, SYSTEM AND NON-TRANSITORY COMPUTER-READABLE RECORDING MEDIUM FOR PROVIDING A MULTILATERAL COMMUNICATION SERVICE

(71) Applicant: SMOOTHY INC., Seoul (KR)

(72) Inventors: Hyun Geun Jo, Yongin-si (KR); Deok Won Kim, Bucheon-si (KR)

(73) Assignee: SMOOTHY INC., Seoul (KR)

( * ) Notice: Subject to any disclaimer, the term of this patent is extended or adjusted under 35 U.S.C. 154(b) by 0 days.

(21) Appl. No.: 16/158,460

(22) Filed: Oct. 12, 2018

(65) Prior Publication Data

US 2019/0044985 A1 Feb. 7, 2019

Related U.S. Application Data

(63) Continuation of application No. PCT/KR2018/004023, filed on Apr. 5, 2018.

(30) Foreign Application Priority Data

Apr. 6, 2017 (KR) .................. 10-2017-0044997

(51) Int. Cl.
| | |
|---|---|
| *H04L 29/06* | (2006.01) |
| *H04N 7/14* | (2006.01) |
| *H04L 12/18* | (2006.01) |
| *H04L 12/58* | (2006.01) |
| *H04N 7/15* | (2006.01) |

(52) U.S. Cl.
CPC ...... *H04L 65/4053* (2013.01); *H04L 12/1813* (2013.01); *H04L 12/1822* (2013.01); *H04L 51/04* (2013.01); *H04L 65/403* (2013.01); *H04N 7/147* (2013.01); *H04N 7/152* (2013.01); *H04L 51/10* (2013.01)

(58) Field of Classification Search
None
See application file for complete search history.

(56) References Cited

U.S. PATENT DOCUMENTS

| | | | |
|---|---|---|---|
| 6,559,863 B1 * | 5/2003 | Megiddo | H04L 12/1827 348/14.08 |
| 8,701,020 B1 * | 4/2014 | Fulcher | G06F 3/0488 715/753 |

(Continued)

*Primary Examiner* — Amal S Zenati
(74) *Attorney, Agent, or Firm* — Dinsmore & Shohl LLP; Yongsok Choi, Esq.

(57) ABSTRACT

A method for a multilateral communication service includes acquiring at least one of a first video taken in a device of a first user, a first voice recorded in the device of the first user, and a first text message entered in the device of the first user; and specifying a plurality of display areas respectively assigned to a plurality of users participating in a conversation, and dynamically providing at least one of the first video, the first voice, and the first text message to a first display area assigned to the first user. When the first video or text message is dynamically provided, the first video or text message is dynamically displayed in the first display area, and when the first text message is dynamically displayed in the first display area, only a text message most recently entered by the first user is displayed in the first display area.

8 Claims, 4 Drawing Sheets

(56) References Cited

U.S. PATENT DOCUMENTS

| | | | | |
|---|---|---|---|---|
| 2004/0107254 A1* | 6/2004 | Ludwig | ............. | G06Q 10/10 |
| | | | | 709/204 |
| 2008/0120370 A1* | 5/2008 | Chan | ............. | G06Q 10/10 |
| | | | | 709/204 |
| 2013/0307920 A1* | 11/2013 | Cahill | ............. | H04N 7/15 |
| | | | | 348/14.03 |
| 2017/0353694 A1* | 12/2017 | Yoakum | ............. | H04N 7/15 |

\* cited by examiner

METHOD, SYSTEM AND NON-TRANSITORY COMPUTER-READABLE RECORDING MEDIUM FOR PROVIDING A MULTILATERAL COMMUNICATION SERVICE

CROSS-REFERENCE TO RELATED APPLICATIONS

This application is a continuation application of Patent Cooperation Treaty (PCT) international application Serial No. PCT/KR2018/004023, filed on Apr. 5, 2018, which claims priority to Korean Patent Application Serial No. 10-2017-0044997, filed on Apr. 6, 2017. The entire contents of PCT international application Serial No. PCT/KR2018/004023 and Korean Patent Application Serial No. 10-2017-0044997 are hereby incorporated by reference.

FIELD OF THE INVENTION

The present invention relates to a method, system, and non-transitory computer-readable recording medium for providing a multilateral communication service.

BACKGROUND

As the Internet and video technology are developed, more and more users are using lively video chats in preference to conventional voice calls or text chats.

As one example of conventional techniques related to video chats widely used in recent years, there has been introduced a service for assisting multiple users to have a video chat together in which a display screen is divided into multiple areas and videos of different users are displayed in the respective areas.

However, the techniques introduced so far, including the above conventional technique, have a limitation that it is difficult to appropriately respond to various environments and needs of a user, because no other option than a video chat is provided even when the user is not able to show his/her own video or desires to have a text chat without showing the video, due to network environments, surrounding conditions, personal preferences, or the like.

In this connection, the inventor(s) present a technique for assisting a plurality of users participating in a conversation to freely and intuitively communicate in various ways desired by the respective users, by dynamically displaying at least one of a video, a voice, and a text message in correspondence to a display area assigned to each of the users.

SUMMARY OF THE INVENTION

One object of the present invention is to solve all the above-described problems in the prior art.

Another object of the invention is to assist a plurality of users to freely and intuitively communicate in various ways desired by the respective users, by acquiring at least one of a first video taken in a device of a first user, a first voice recorded in the device of the first user, and a first text message entered in the device of the first user; and specifying a plurality of display areas respectively assigned to a plurality of users participating in a conversation, and dynamically providing at least one of the first video, the first voice, and the first text message in correspondence to a first display area assigned to the first user, wherein when the first video or the first text message is dynamically provided, the first video or the first text message is dynamically displayed in the first display area, and wherein when the first text message is dynamically displayed in the first display area, only a text message most recently entered by the first user is displayed in the first display area.

The representative configurations of the invention to achieve the above objects are described below.

According to one aspect of the invention, there is provided a method for providing a multilateral communication service, comprising the steps of: acquiring at least one of a first video taken in a device of a first user, a first voice recorded in the device of the first user, and a first text message entered in the device of the first user; and specifying a plurality of display areas respectively assigned to a plurality of users participating in a conversation, and dynamically providing at least one of the first video, the first voice, and the first text message in correspondence to a first display area assigned to the first user, wherein in the providing step, when the first video or the first text message is dynamically provided, the first video or the first text message is dynamically displayed in the first display area, and wherein in the providing step, when the first text message is dynamically displayed in the first display area, only a text message most recently entered by the first user is displayed in the first display area.

According to another aspect of the invention, there is provided a system for providing a multilateral communication service, comprising: a data acquisition unit configured to acquire at least one of a first video taken in a device of a first user, a first voice recorded in the device of the first user, and a first text message entered in the device of the first user; and a conversation state management unit configured to specify a plurality of display areas respectively assigned to a plurality of users participating in a conversation, and to dynamically provide at least one of the first video, the first voice, and the first text message in correspondence to a first display area assigned to the first user, wherein when the first video or the first text message is dynamically provided, the conversation state management unit is configured to dynamically display the first video or the first text message in the first display area, and wherein when the first text message is dynamically displayed in the first display area, the conversation state management unit is configured to display only a text message most recently entered by the first user in the first display area.

In addition, there are further provided other methods and systems to implement the invention, as well as non-transitory computer-readable recording media having stored thereon computer programs for executing the methods.

According to the invention, it is possible to dynamically display at least one of a video, a voice, and a text message in a plurality of display areas respectively assigned to a plurality of users, so that the plurality of users may freely and intuitively communicate in various ways desired by the respective users.

According to the invention, it is possible to easily switch a display scheme (e.g., a video display scheme, a text message display scheme, or a video and text message display scheme) to suit the situations or needs of users, so that a multilateral communication service may be provided to meet various environments and needs.

According to the invention, it is possible to allow only a text message most recently entered by a user to be displayed in a display area, so that the contents and contexts of a conversation may be intuitively recognized at a glance even in a complex situation in which there are multiple users participating in the conversation.

According to the invention, it is possible to display a process of a text message being entered (i.e., typed) by a user in real time, so that users participating in a conversation may lively communicate with each other.

DETAILED DESCRIPTION

Figure 1:
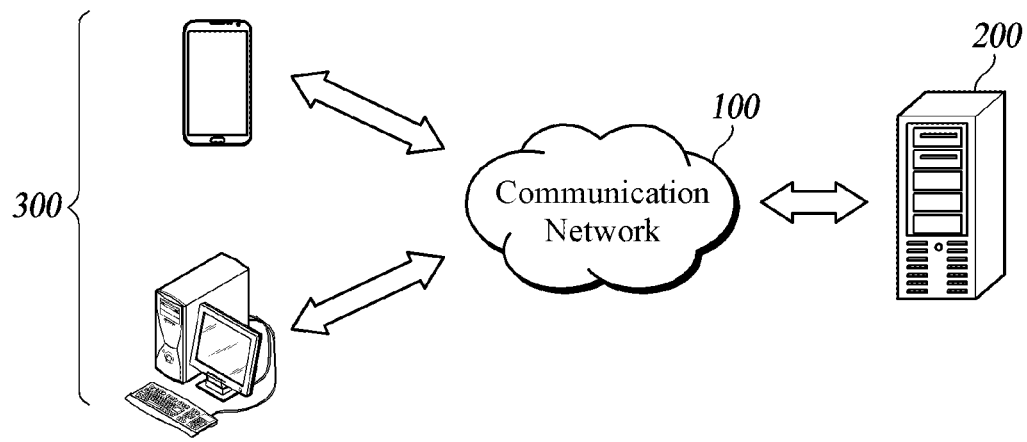
FIG. 1 schematically shows the configuration of an entire system for providing a multilateral communication service according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of an entire system for providing a multilateral communication service according to one embodiment of the invention.

As shown in FIG. 1, the entire system according to one embodiment of the invention may comprise a communication network 100, a service provision system 200, and a user device 300.

First, the communication network 100 according to one embodiment of the invention may be configured regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, Bluetooth communication (e.g., Bluetooth Low Energy (BLE) communication), infrared communication, and ultrasonic communication.

Next, the service provision system 200 according to one embodiment of the invention may communicate with the user device 300 to be described below via the communication network 100, and may function to assist multiple users to freely and intuitively communicate in various ways desired by the respective users, by acquiring at least one of a first video taken in a device of a first user, a first voice recorded in the device of the first user, and a first text message entered in the device of the first user; and specifying a plurality of display areas respectively assigned to a plurality of users participating in a conversation, and dynamically providing at least one of the first video, the first voice, and the first text message in correspondence to a first display area assigned to the first user, wherein when the first video or the first text message is dynamically provided, the first video or the first text message is dynamically displayed in the first display area, and wherein when the first text message is dynamically displayed in the first display area, only a text message most recently entered by the first user is displayed in the first display area.

The configurations and functions of the service provision system 200 according to the invention will be discussed in more detail below. Meanwhile, although the service provision system 200 has been described as above, the above description is illustrative and it will be apparent to those skilled in the art that at least a part of the functions or components required for the service provision system 200 may be implemented or included in the user device 300 or an external system (not shown), as necessary.

Next, according to one embodiment of the invention, the user device 300 is digital equipment that may function to connect to and then communicate with the service provision system 200 via the communication network 100, and any type of digital equipment having a memory means and a microprocessor for computing capabilities, such as a smart phone, a notebook PC, a desktop PC, and a tablet PC, may be adopted as the user device 300 according to the invention. Further, according to one embodiment of the invention, the user device 300 may also include a camera module (not shown) required to implement a multilateral communication service according to the invention.

Meanwhile, according to one embodiment of the invention, the user device 300 may include an application for supporting functions required to allow a user to use a multilateral communication service according to the invention. The application may be downloaded from the service provision system 200 or an external application distribution server (not shown).

Configuration of the Service Provision System

Hereinafter, the internal configuration of the service provision system 200 crucial for implementing the invention and the functions of the respective components thereof will be discussed.

Figure 2:
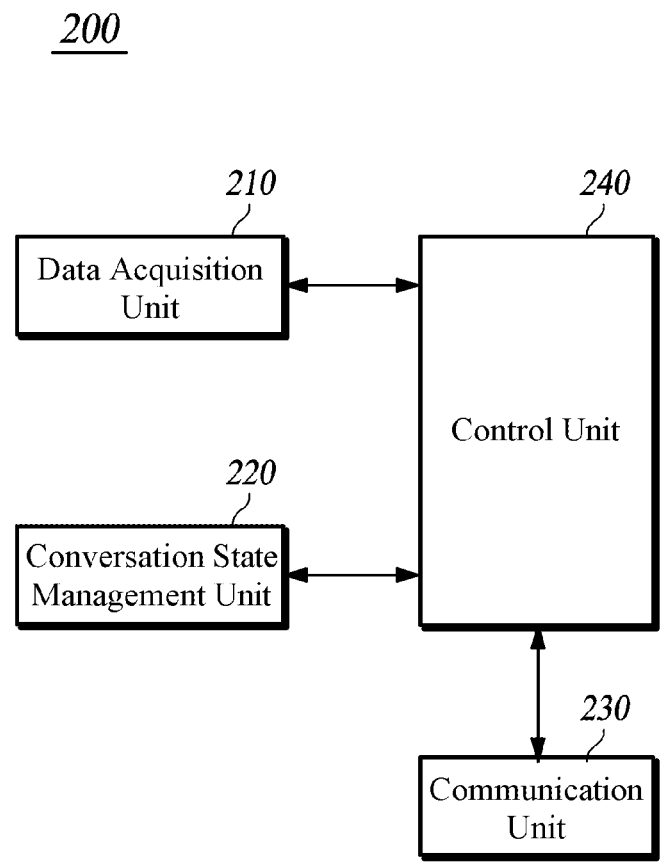
FIG. 2 illustratively shows the internal configuration of a service provision system according to one embodiment of the invention.

FIG. 2 illustratively shows the internal configuration of the service provision system according to one embodiment of the invention.

The service provision system 200 according to one embodiment of the invention may be digital equipment having a memory means and a microprocessor for computing capabilities. The service provision system 200 may be a server system or the user device 300.

As shown in FIG. 2, the service provision system 200 may comprise a data acquisition unit 210, a conversation state management unit 220, a communication unit 230, and a control unit 240. According to one embodiment of the invention, at least some of the data acquisition unit 210, the conversation state management unit 220, the communication unit 230, and the control unit 240 may be program modules to communicate with an external system. The program modules may be included in the service provision system 200 in the form of operating systems, application program modules, and other program modules, while they may be physically stored in a variety of commonly known storage devices. Further, the program modules may also be stored in a remote storage device that may communicate with the service provision system 200. Meanwhile, such program modules may include, but not limited to, routines, subroutines, programs, objects, components, data structures, and the like for performing specific tasks or executing specific abstract data types as will be described below in accordance with the invention.

First, according to one embodiment of the invention, the data acquisition unit 210 may function to acquire data on at least one of a video taken in a device of a first user, a voice recorded in the device of the first user, and a text message entered in the device of the first user. Further, according to one embodiment of the invention, when the service provision system 200 is implemented in a remote device (e.g., a server) physically separated from the user device 300, the data acquisition unit 210 may function to transmit the acquired video, voice, or text message to the devices 300 of a plurality of users participating in a conversation.

Next, according to one embodiment of the invention, the conversation state management unit 220 may function to specify a plurality of display areas respectively assigned to the plurality of users participating in the conversation. According to one embodiment of the invention, the plurality of display areas specified as above may be displayed in real time in the devices 300 of the plurality of users participating in the conversation.

Further, according to one embodiment of the invention, the conversation state management unit 220 may function to dynamically provide at least one of the video taken in the device of the first user (hereinafter, "the first video"), the voice recorded in the device of the first user (hereinafter, "the first voice"), and the text message entered in the device of the first user (hereinafter, "the first text message") in correspondence to a first display area assigned to the first user.

Specifically, according to one embodiment of the invention, when the first video or the first text message is provided, the conversation state management unit 220 may dynamically display the first video or the first text message in the first display area.

Further, according to one embodiment of the invention, when the first text message is dynamically displayed in the first display area, the conversation state management unit 220 may display only a text message most recently entered by the first user in the first display area.

In addition, according to one embodiment of the invention, the conversation state management unit 220 may function to assist the first user to directly enter a new text message in the first display area assigned to the first user.

Further, according to one embodiment of the invention, when the text message entered in the device of the first user is displayed in the first display area, the conversation state management unit 220 may also display a process of the text message being entered by the first user in real time in the first display area.

Meanwhile, according to one embodiment of the invention, the conversation state management unit 220 may set any one of a first mode in which only the first video is provided, a second mode in which only the first voice is provided, a third mode in which only the first text message is provided, a fourth mode in which the first video and the first voice are provided, a fifth mode in which the first voice and the first text message are provided, a sixth mode in which the first video and the first text message are provided, and a seventh mode in which the first video, the first voice, and the first text message are provided, according to conversation mode selection information from the first user.

Next, the communication unit 230 according to one embodiment of the invention may function to enable data transmission/reception from/to the data acquisition unit 210 and the conversation state management unit 220.

Lastly, the control unit 240 according to one embodiment of the invention may function to control data flow among the data acquisition unit 210, the conversation state management unit 220, and the communication unit 230. That is, the control unit 240 according to the invention may control data flow into/out of the service provision system 200 or data flow among the respective components of the service provision system 200, such that the data acquisition unit 210, the conversation state management unit 220, and the communication unit 230 may carry out their particular functions, respectively.

Figure 3:
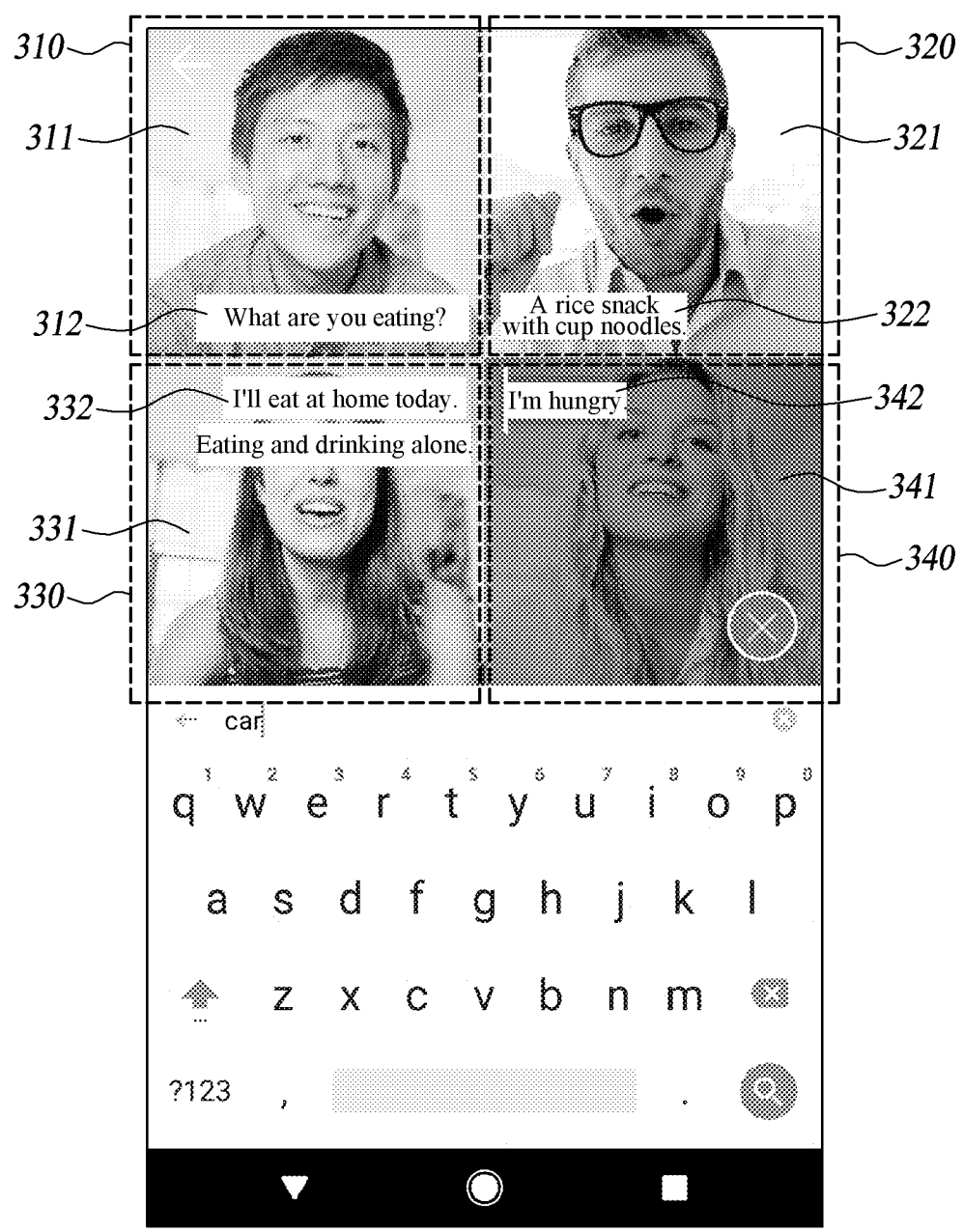
FIG. 3 illustratively shows a user interface provided to a user device according to one embodiment of the invention.
Figure 4:
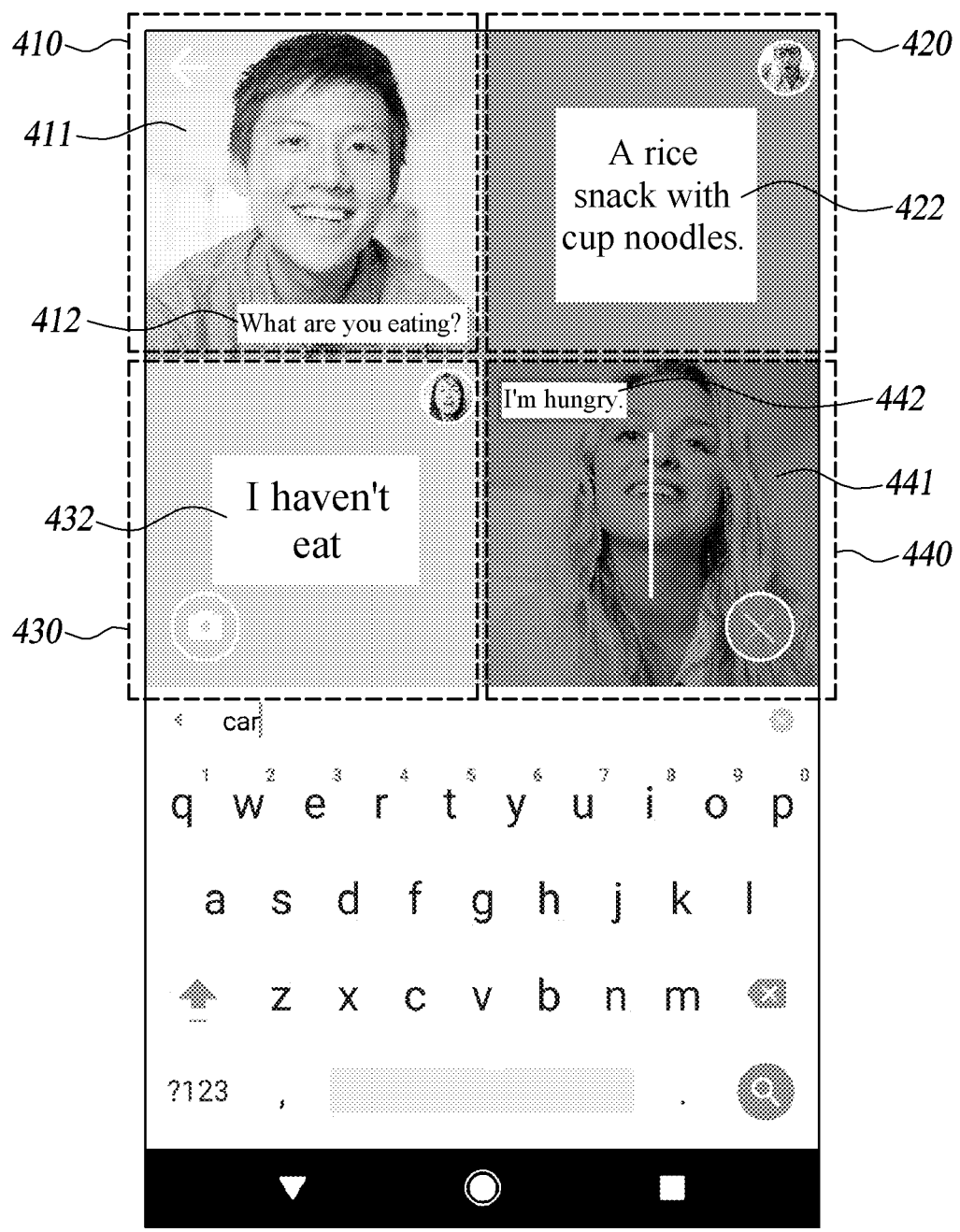
FIG. 4 illustratively shows a user interface provided to a user device according to one embodiment of the invention.
Figure 5:
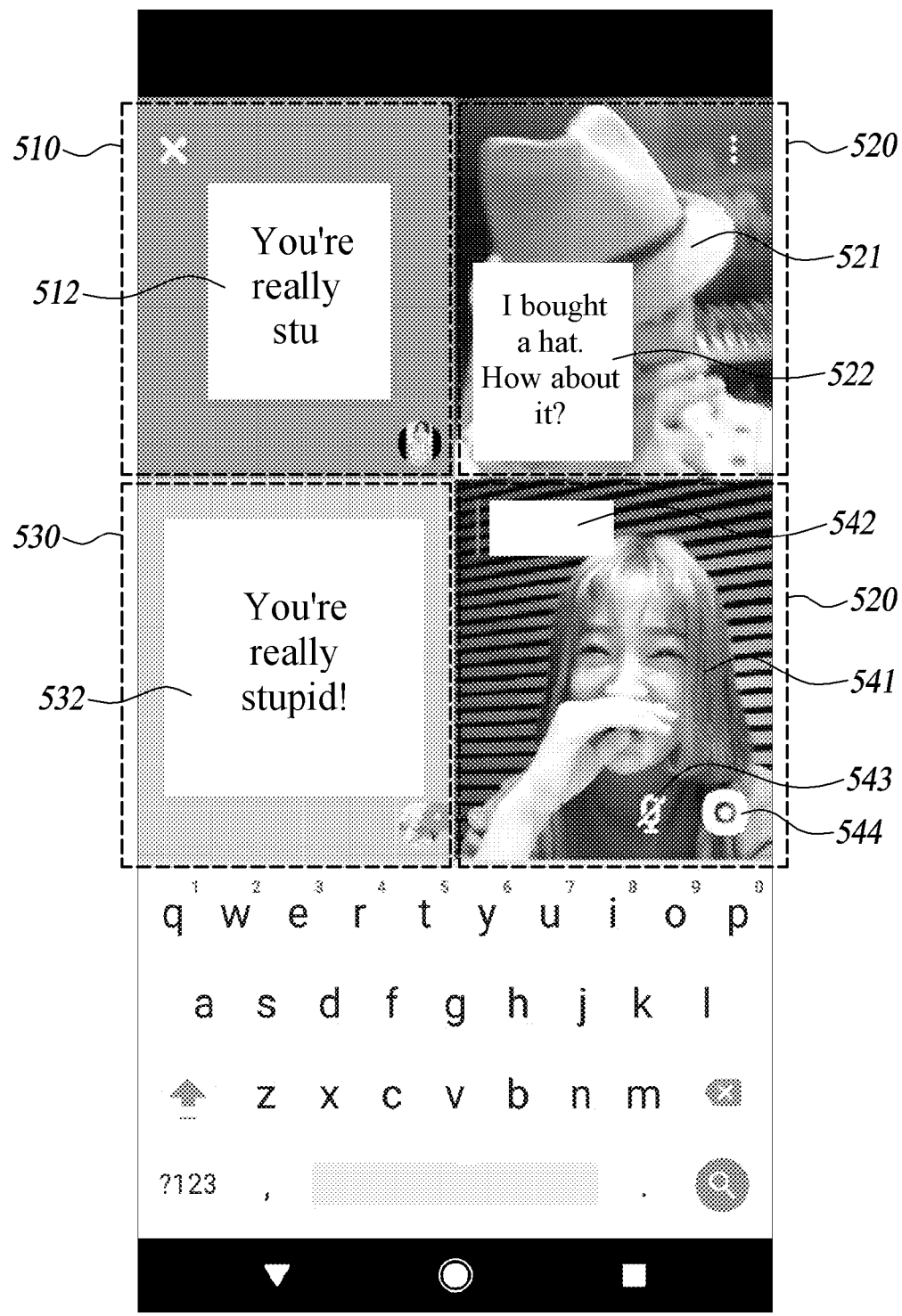
FIG. 5 illustratively shows a user interface provided to a user device according to one embodiment of the invention.

FIGS. 3 to 5 illustratively show user interfaces provided to a user device according to one embodiment of the invention.

First, in the embodiment of FIG. 3, it may be assumed that four users have a conversation in a mode in which videos and text messages are displayed. As discussed above, the conversation mode may be arbitrarily set by each of the four users.

Referring to FIG. 3, in all devices of the four users participating in the conversation, first to fourth display areas 310, 320, 330, and 340 respectively assigned to the first to fourth users may be displayed as separated from each other. Here, the first to fourth display areas 310, 320, 330, and 340 may be displayed as symmetrically or asymmetrically divided.

Referring further to FIG. 3, in the first to fourth display areas, videos 311, 321, 331, and 341 taken in the devices of the first to fourth users may be respectively displayed, and text messages 312, 322, 332, and 342 most recently entered in the devices of the first to fourth users may also be respectively displayed.

Referring further to FIG. 3, a user may directly enter a new text message in the display area 440 assigned to the user (i.e., the display area in which the video or text message of the user is being displayed), and a process of the text message being entered by the user may be displayed in real time in the display area 440 assigned to the user. Next, in the embodiment of FIG. 4, it may be assumed that the first and fourth users among the four users have a conversation in a mode in which videos and text messages are displayed, and the second and third users have a conversation in a mode in which only text messages are displayed. As discussed above, the conversation mode may be arbitrarily set by each of the four users.

Next, in the embodiment of FIG. 5, it may be assumed that four users have a conversation through at least one of videos, voices, and text messages. As discussed above, the conversation mode may be arbitrarily set by each of the four users.

Referring to FIG. 5, a first user and a third user who have selected a conversation mode in which only text messages are provided may transmit only their text messages to other users through a first display area 510 and a third display area 530, respectively. Meanwhile, a second user and a fourth user who have selected a conversation mode in which videos and text messages are provided may transmit their videos and text messages to other users through a second display area 520 and a fourth display area 540, respectively.

Referring further to FIG. 5, a user participating in the conversation may select not only whether to display a video or text message through a display area assigned to the user, but also whether to transmit a voice of the user to other users. For example, the fourth user may easily set whether to transmit his/her voice to other users by selecting a microphone-shaped icon 543 present in the fourth display area 540 assigned to the fourth user. A user may also easily set whether to display a video or text message by selecting a predetermined icon 544.

As described above, in contrast to a traditional chat method in which multiple text messages are sequentially displayed in order of time (i.e., according to a timeline), the present invention may display only a text message most recently entered by a certain user in a display area assigned to the user, so that users participating in a conversation may recognize the contents and contexts of the conversation more intuitively.

Further, in contrast to a traditional chat method in which a message is transmitted to a counterpart after entry of the text message is completed (e.g., after a user enters the text message and then presses an enter key or selects a transmission icon), the present invention may display a process of a text message being entered letter by letter by a certain user in real time in a display area assigned to the user, so that users participating in a conversation may feel realism or liveliness as if they are actually having a conversation with their counterparts.

Furthermore, according to the invention, a plurality of users participating in a conversation need not unify a communication method, and may freely select a mode in which videos are provided, a mode in which voices are provided, a mode in which text messages are provided, a mode in which at least two of videos, voices, and text messages are provided in combination, or the like, and may easily switch from one mode to another, as desired by the respective users, so that a communication service may be implemented to flexibly respond to various environments and needs of the users.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing a multilateral communication service, comprising the steps of:
   acquiring at least one of a first video taken in a device of a first user, a first voice recorded in the device of the first user, and a first text message entered in the device of the first user; and
   specifying a plurality of display areas respectively assigned to a plurality of users participating in a conversation, and dynamically providing at least one of the first video, the first voice, and the first text message in correspondence to a first display area assigned to the first user,
   wherein in the providing step, when the first video and the first text message are dynamically provided, both the first video and the first text message are dynamically displayed in the first display area,
   wherein in the providing step, when the first text message is dynamically displayed in the first display area, only a text message most recently entered by the first user is displayed in the first display area,
   wherein in the providing step, a process of a new text message being entered by the first user is displayed in real time in the first display area, and
   wherein a progress of entering each of letters of the new text message is displayed in real time in the first display area of the device of the first user and is displayed in real time in the first display area of a device of another user.

2. The method of claim 1, wherein the plurality of display areas are displayed in real time in devices of the plurality of users.

3. The method of claim 1, wherein in the providing step, the first user is assisted to directly enter a new text message in the first display area.

4. The method of claim 1, wherein in the providing step, any one of a first mode in which only the first video is provided, a second mode in which only the first voice is provided, a third mode in which only the first text message is provided, a fourth mode in which the first video and the first voice are provided, a fifth mode in which the first voice and the first text message are provided, a sixth mode in which the first video and the first text message are provided, and a seventh mode in which the first video, the first voice, and the first text message are provided, is set according to selection information from the first user.

5. The method of claim 1, wherein the first text message is displayed within a boundary of the first video displayed in the first display area.

6. A non-transitory computer-readable recording medium having stored thereon a computer program for executing the method of claim 1.

7. A system for providing a multilateral communication service, comprising:
   a data acquisition unit configured to acquire at least one of a first video taken in a device of a first user, a first voice recorded in the device of the first user, and a first text message entered in the device of the first user; and
   a conversation state management unit configured to specify a plurality of display areas respectively assigned to a plurality of users participating in a conversation, and to dynamically provide at least one of the first video, the first voice, and the first text message in correspondence to a first display area assigned to the first user,
   wherein when the first video and the first text message are dynamically provided, the conversation state management unit is configured to dynamically display both the first video and the first text message in the first display area,
   wherein when the first text message is dynamically displayed in the first display area, the conversation state management unit is configured to display only a text message most recently entered by the first user in the first display area,
   wherein in the providing step, a process of a new text message being entered by the first user is displayed in real time in the first display area, and
   wherein a progress of entering each of letters of the new text message is displayed in real time in the first display area of the device of the first user and is displayed in real time in the first display area of a device of another user.

8. The system of claim 7, wherein the first text message is displayed within a boundary of the first video displayed in the first display area.

* * * * *